United States Patent
Mangus et al.

(10) Patent No.: US 12,033,439 B2
(45) Date of Patent: Jul. 9, 2024

(54) FAULT DETECTION AND MITIGATION ON AN AGRICULTURAL MACHINE

(71) Applicant: Deere & Company, Moline, IL (US)

(72) Inventors: Devin L. Mangus, Ankeny, IA (US); Benjamin T. Miller, Pleasant Hill, IA (US); Bernhard Winkler, Homburg (DE)

(73) Assignee: Deere & Company, Moline, IL (US)

( * ) Notice: Subject to any disclaimer, the term of this patent is extended or adjusted under 35 U.S.C. 154(b) by 126 days.

(21) Appl. No.: 17/485,710

(22) Filed: Sep. 27, 2021

(65) Prior Publication Data

US 2022/0366730 A1  Nov. 17, 2022

Related U.S. Application Data

(60) Provisional application No. 63/188,686, filed on May 14, 2021.

(51) Int. Cl.
*G07C 5/00* (2006.01)
*A01B 69/04* (2006.01)
*G05B 23/02* (2006.01)
*G07C 5/08* (2006.01)

(52) U.S. Cl.
CPC .......... *G07C 5/008* (2013.01); *A01B 69/008* (2013.01); *G05B 23/0259* (2013.01); *G07C 5/085* (2013.01)

(58) Field of Classification Search
CPC ...... G07C 5/008; G07C 5/085; A01B 69/008; G05B 23/0259; G05B 2219/24042; G05B 23/0264; G05B 23/024
USPC ......................................................... 701/50
See application file for complete search history.

(56) References Cited

U.S. PATENT DOCUMENTS

| | | | |
|---|---|---|---|
| 10,985,970 B1 * | 4/2021 | Goyal | G06F 16/2477 |
| 2003/0139908 A1 | 7/2003 | Wegerich et al. | |
| 2014/0025253 A1 * | 1/2014 | Rybak | G07C 5/085 701/32.7 |

(Continued)

FOREIGN PATENT DOCUMENTS

| | | |
|---|---|---|
| EP | 1724730 B1 | 5/2008 |
| EP | 1564688 B1 | 3/2011 |
| EP | 1221280 B2 | 7/2011 |

OTHER PUBLICATIONS

Extended European Search Report and Written Opinion issued in European Patent Application No. 22170827.4, dated Oct. 20, 2022, in 10 pages.

*Primary Examiner* — Tyler D Paige
(74) *Attorney, Agent, or Firm* — Kelly, Holt & Christenson; Joseph R. Kelly

(57) ABSTRACT

A fault database includes a fault identifier, a signature or pattern that indicates the presence of the fault, and a set of mitigation control steps. The fault database is intermittently updated and downloaded to an agricultural machine. A fault identification system on the agricultural machine scans data logs that are generated by a log generation system on the agricultural machine and compares information in the data logs to the signature or pattern in the fault database to determine whether any of the faults in the fault database are present on the agricultural machine. If a fault in the fault database is present, a mitigation control step is identified to mitigate the fault, and a control signal is generated on the agricultural machine to implement the mitigation control step.

18 Claims, 10 Drawing Sheets

(56) References Cited

U.S. PATENT DOCUMENTS

| | | | |
|---|---|---|---|
| 2015/0254127 A1* | 9/2015 | Matthews | G06F 11/0748 714/2 |
| 2018/0005132 A1 | 1/2018 | Singh et al. | |
| 2019/0041835 A1 | 2/2019 | Cella et al. | |

* cited by examiner

FAULT DETECTION AND MITIGATION ON AN AGRICULTURAL MACHINE

FIELD OF THE DESCRIPTION

The present description relates to agricultural machines. More specifically, the present description relates to identifying and correcting faults or errors in the operation of agricultural machines.

BACKGROUND

There are a wide variety of different types of agricultural machines. Such agricultural machines can include tillage machines, harvesters, planters and seeders, among others. These types of agricultural machines can be highly complex in that they often include computer driven systems, subsystems and components. Similarly, the components may be provided by different suppliers. Therefore, when a problem or fault occurs in the operation of the agricultural machine, it can be cumbersome and time consuming to address the problem or fault.

When a problem or fault occurs, an operator often reports the problems or faults to a vendor or a manufacturer that uses expert knowledge and engineering staff to attempt to identify the problem or fault. Often, additional data gathering is needed. Therefore, logs that log operation of different systems, subsystems, and components need to be uploaded for analysis. The analysis can then be performed to identify a potential solution. The potential solution is then communicated back to the agricultural machine operator who attempts to implement the potential solution in order to address the fault or problem.

The discussion above is merely provided for general background information and is not intended to be used as an aid in determining the scope of the claimed subject matter.

SUMMARY

A fault database includes a fault identifier, a signature or pattern that indicates the presence of the fault, and a set of mitigation control steps. The fault database is intermittently updated and downloaded to an agricultural machine. A fault identification system on the agricultural machine scans data logs that are generated by a log generation system on the agricultural machine and compares information in the data logs to the signature or pattern in the fault database to determine whether any of the faults in the fault database are present on the agricultural machine. If a fault in the fault database is present, a mitigation control step is identified to mitigate the fault, and a control signal is generated on the agricultural machine to implement the mitigation control step. An operator can also be navigated through a user experience to capture a fault that may not yet be present in the fault database.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, in some current systems, an agricultural machine may experience a fault. As used herein, for example, a fault is a problem with the operational performance of an agricultural machine. The fault may arise because some part of the agricultural machine is not operating or is operating at a performance level that is lower than desired by the operator. In some current systems, identifying and addressing the core cause of a fault can be time consuming, cumbersome, and error prone. This can be exacerbated by the fact that operators may often describe the same fault in different ways. Therefore, engineers or other troubleshooting experts may be unable to accurately correlate a description of a fault to the underlying core cause of the fault. Thus, when a different operator (or an operator of a different agricultural machine) reports the same fault at a later time, the different operator may describe the same fault in different ways so it is difficult for the troubleshooting engineers to determine whether the fault has already been addressed in a prior troubleshooting operation.

The present description thus proceeds with respect to a system in which, when a fault is reported, the fault is identified and log data is scanned to identify fault tags or other data or data patterns that can be used as a fault signature. A fault database is generated. The fault database may include records that represent faults. The records may include a fault identifier, a fault signature that occurred in the data logs during the fault and that is correlated to the fault, and mitigation control steps that can be taken to eliminate or mitigate the fault. When that fault signature is encountered later in the agricultural machine data logs, the same fault can be identified using the fault database. The fault database can also be updated as different faults are identified from the same agricultural machine or from different agricultural machines, and the updated fault database can then be downloaded onto different agricultural machines so that the updated fault database can be scanned to identify errors on the agricultural machine. As the fault database is continuously updated, it can be intermittently downloaded again to the agricultural machines to keep the fault detection on the agricultural machines current.

Figure 1:
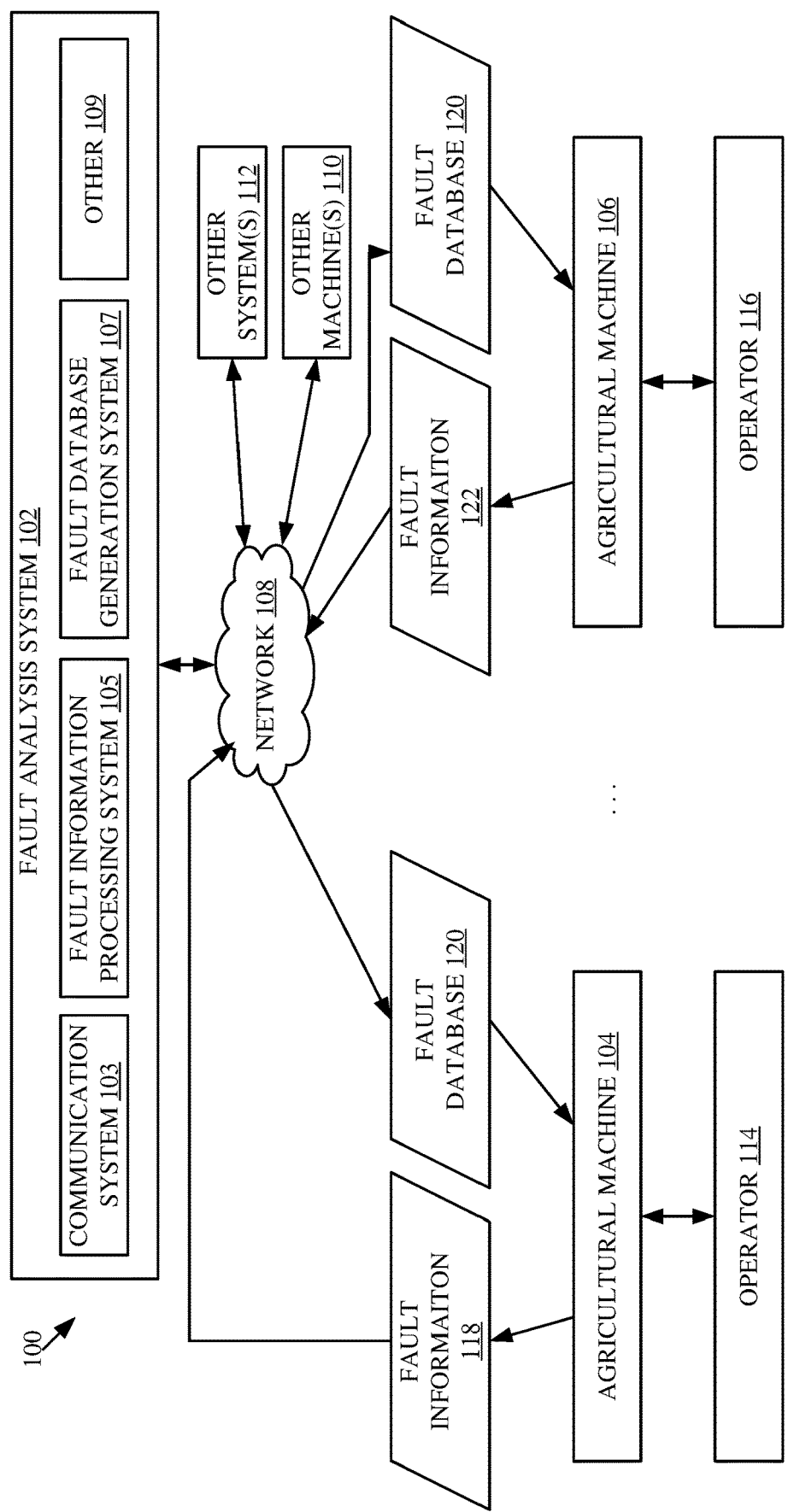
FIG. 1 is a block diagram of one example of an agricultural system.

FIG. 1 is a block diagram of one example of an agricultural system 100. System 100 includes a fault analysis system 102 that can be accessed by a plurality of different agricultural machines 104-106 over network 108. Fault analysis system 102 and agricultural machines 104-106 may also be in communication with other machines 110 and other systems 112 over network 108. Agricultural machines 104-106 may be any type of agricultural machines, such as tillage machines, harvesters, seeders or planters, or other agricultural machines. Network 108 may be a wide area network, a local area network, a near field communication network, a cellular communication network, or any other of a wide variety of networks or combinations of networks. FIG. 1 also shows that agricultural machine 104 may be operated by operator 114 and agricultural machine 106 may be operated by operator 116. In one example, when agricultural machine 104 exhibits a fault in operation, operator 114 may provide an input to agricultural machine 104 to send fault information 118 over network 108 to fault analysis system 102. In another example, agricultural machine 104 may itself automatically determine that an error or fault is occurring and send fault information 118 to fault analysis system 102.

The fault information 118 is received by communication system 103 at fault analysis system 102. Fault information processing system 105 analyzes the fault information 118 to identify the core reason for the fault. Fault information processing system 105 can include automated fault analysis functionality as well as manual resources. Fault information processing system 105 at fault analysis system 102 may also identify mitigation control steps that can be executed on agricultural machine 104 in order to mitigate or address the fault that is occurring at agricultural machine 104. The mitigation control steps are then sent back to agricultural machine 104. In addition, fault analysis system 102 may include a fault database generation system 107 which can update a fault database 120 that stores records of faults, the signatures or other information that identifies those faults, and mitigation control steps that can be used to address the faults. The fault information can be received from the different agricultural machines 104-106 so that the fault database 120 generated by fault analysis system 102 may be updated based on faults reported by all of the different agricultural machines 104-106. The updated fault database 120 may then be downloaded to agricultural machine 104 where a fault identification system can scan the fault database 120 and compare it against logged data, sensor inputs, or other information on agricultural machine 104 to determine when a fault is occurring. The agricultural machine 104 can then automatically execute the corresponding mitigation control steps to mitigate the fault, or agricultural machine 104 may surface the mitigation control steps on an operator interface mechanism for operator 114, instructing operator 114 how to perform the mitigation control steps.

FIG. 1 also shows that agricultural machine 106 can send fault information 122 through network 108 to fault analysis system 102. Fault analysis system 102 can identify the fault occurring on machine 116, the signature or other data that indicates that the fault is present, and mitigation control steps that can be used to mitigate the fault and update the fault database 120 accordingly. The updated fault database 120 can then be downloaded to agricultural machine 106 and to agricultural machine 104. In this way, each of the agricultural machines 104-106 can benefit from faults on other of the agricultural machines 104-106 that have been addressed by fault analysis system 102. Thus, when the updated fault database 120 is downloaded to agricultural machines 104-106, the faults may be recognized and mitigated even though it is the first time that the particular fault has occurred on the particular agricultural machine.

Figure 2:
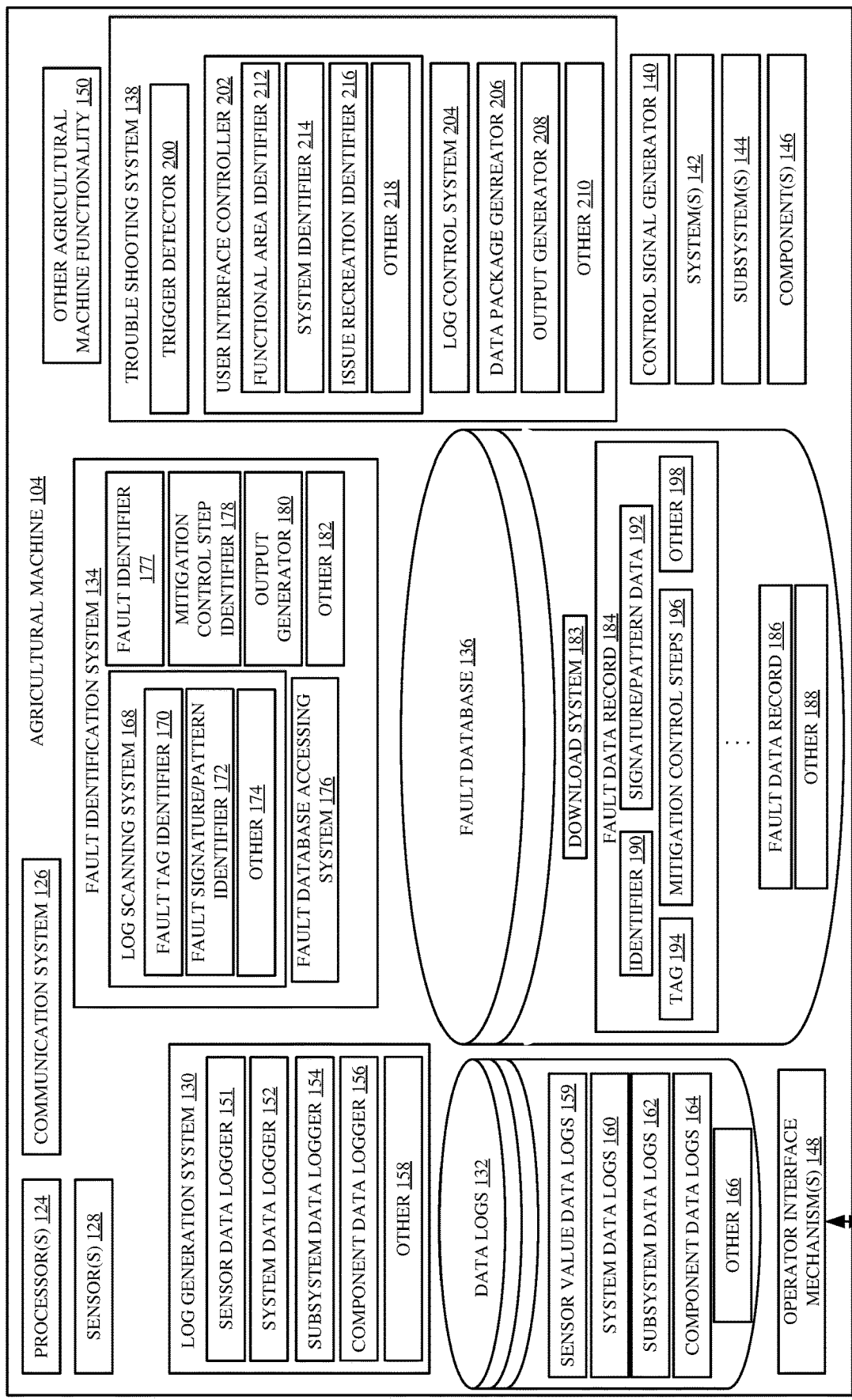
FIG. 2 is a block diagram showing one example of an agricultural harvester.

FIG. 2 is a block diagram showing one example of agricultural machine 104 in more detail. In the example shown in FIG. 2, agricultural machine 104 includes one or more processors 124, communication system 126, one or more sensors 128, log generation system 130, data logs 132, fault identification system 134, fault database 136, troubleshooting system 138, control signal generator 140, systems 142, subsystems 144, components 146, user interface mechanisms 148 and other agricultural machine functionality 150. Log generation system 130 includes sensor data logger 151, system data logger 152, subsystem data logger 154, component data logger 156, and other items 158. Data logs 132 include sensor value data logs 159, system data logs 160, subsystem data logs 162, component data logs 164, and other items 166. Fault identification system 134 illustratively includes log scanning system 168, which, itself, includes fault tag identifier 170, fault signature/pattern identifier 172, and other items 174. Fault identification system 134 also illustratively includes fault database accessing system 176, fault identifier 177, mitigation control step identifier 178, output generator 180, and other items 182. Fault database 136 includes download system 183, fault data records 184-186, and other items 188. Each fault data record 184-186 may include fault identifier 190, signature/pattern data 192, tag 194, mitigation control steps 196, and other items 198. Fault database 136 may include download system 183. Download system 183 may also be separate from fault database 136. In one example, download system 183 controls how often the fault database 136 is downloaded from fault analysis system 102. In another example, the frequency with which the fault database 136 is downloaded is controlled by fault analysis system 102 and download system 183 controls communication system 126 to facilitate that download. Troubleshooting system 138 can include trigger detector 200, user interface controller 202, log control system 204, data package generator 206, output generator 208, and other items 210. User interface controller 202, can, itself, include functional area identifier 212, symptom identifier 214, issue recreation identifier 216, and other items 218. Before describing the overall operation of agricultural machine 104, a brief description of some of the items in agricultural machine 104, and their operation, will first be provided.

Processors 124 may include one or more central processing units with associated random access memory (RAM), timing circuitry and other logic or memory.

Communication system 126 facilitates communication among the various items on agricultural machine 104 and communication over network 108. Therefore, communication system 126 can be a controller area network—CAN—bus controller and CAN bus. Communication system 126 may be any of a wide variety of different types of systems depending upon the particular communication that it is to enable. For instance, if network 108 includes a cellular communication network, then communication system 126 will include a cellular communication system so that communication system 126 can communicate over network 108. This is just one example and communication system 126 can include one or more different or additional communication systems as well.

Sensors 128 may include a wide variety of different types of sensors, depending upon the type of agricultural machine 104 the sensors 128 are disposed on.

Sensors 128 may sense one or more of the performance of agricultural machine 104, environmental conditions in the environment of agricultural machine 104, crop conditions or crop properties, soil conditions or soil properties, the operation of processors 124, the operation of communication system 126, and other sensors 128, or a wide variety of other sensors.

Log generation system 130 logs information from one or more of sensors 128, systems 142, subsystems 144, and components 146. The data can be logged along with a time that the data was captured, the location of agricultural machine 104 when the data was captured, and any of a wide variety of other information.

Log generation system 130 can log the data periodically or otherwise intermittently. The rate at which the data is logged may be constant or variable so the rate can be increased or decreased. In addition, each of the different data loggers 151-158 may be separately controlled to increase the amount or extent of data logged from certain areas of agricultural machine 104 under different circumstances. By way of example, assume that a component 146 is suspected of failure. In that case, component data logger 156 may increase the frequency with which it captures data regarding the operation of component 146 or the amount of different data or data types captured.

Sensor data logger 151 captures and logs the sensor signals or values sensed by sensors 128. System data logger 152 captures data generated by or sensed from systems 142. Subsystem data logger 154 logs data captured from or sensed from subsystems 144 and component data logger 156 captures data generated by or sensed from components 146. Log generation system 130 generates an output indicative of the data captured by data loggers 151-158 and stores that data in data logs 132. The sensor data can be stored as sensor value data logs 159. The system data can be stored as system data logs 160. The subsystem data can be stored as subsystem data logs 162, and the component data can be stored as component data logs 164. Also, each log entry may include combinations of data. For instance, a log entry in data log 132 for a particular time period may include the sensor data values, system data, subsystem data, and component data captured during that time period. The log entries can include data that is combined in other ways as well.

Fault identification system 134 scans the data logs 132 and accesses fault database 136 to determine whether any faults or issues are occurring on agricultural machine 104. For example, log scanning system 168 can scan the data logs 132 for information that has been logged by log generation system 130. Fault database accessing system 176 can access the fault data records 184-186 in fault database 136. Fault identifier 177 can compare the information extracted from data logs 132 by log scanning system 168 to the signature/pattern data 192 or fault tags 194 in the fault data records 184-186 to identify any faults that are occurring in agricultural machine 104. In log scanning system 168 fault tag identifier 170 identifies any fault tags in the data logs 132 and provides the tags to fault identifier 177 that compares the tags against fault tags 194 in fault database 136. Fault signature/pattern identifier 172 identifies any fault signatures or data patterns in the data logs 132 and provides the signature or patterns to fault identifier 177 that compares them against the signature/pattern data 192 in the fault data records 184-186. If a tag or signature data pattern matches a fault data record 184-186, then fault identifier 177 generates an output indicating that the fault represented by the matching fault data record has occurred.

If fault identifier 177 generates an output indicating that a fault has been identified, then mitigation control step identifier 178 identifies the corresponding mitigation control steps 196 in the matched fault record 184 corresponding to the identified fault. Output generator 180 generates an output to control signal generator 140 to perform the mitigation control steps. For instance, control signal generator 140 can control operator interface mechanisms 148 to output the recommended mitigation control steps to operator 114 so that operator 114 can manually perform the mitigation control steps. In another example, where the mitigation control steps may be automatically performed, control signal generator 140 can generate control signals to control the systems 142, subsystems 144 and components 146, on agricultural harvester 104, in order to execute the mitigation control steps. Control signal generator 140 can also generate control signals to recommend some mitigation control steps to operator 114 for manual execution while also generating control signals to automatically perform other mitigation control steps.

Troubleshooting system 138 is used to interact with fault analysis system 102 (shown in FIG. 1) when a fault is either triggered by an operator input from operator 114 (such as when an operator observes degraded performance of agricultural machine 104 or another type of symptom indicating a fault or failure in the operation of agricultural machine 104), or when a fault is detected by fault identification system 134 (such as when fault tag identifier 170 identifies a fault tag in data logs 132 indicating that a fault has occurred), but where a fault data record does not exist in fault database 136 for the identified fault. Trigger detector 200 detects either the operator input or automated trigger to activate troubleshooting system 138.

User interface controller 202 can control operator interface mechanisms 148 to prompt operator 114 for certain information that will enhance the information provided for troubleshooting. For instance, functional area identifier 212 will generate a user input mechanism allowing operator 114 to identify the functional area of agricultural machine 104 where the symptom of the fault or error is occurring. Symptom identifier 214 generates an input mechanism on operator interface mechanisms 148 where operator 114 can input information to further define symptoms of the fault or error. Issue recreation identifier 216 generates an input mechanism on operator interface mechanisms 148 that allows operator 114 to indicate when the fault has occurred or has been recreated in agricultural machine 104.

Log control system 204 can control log generation system 130 to increase the frequency with which data samples are logged. Log control system 204 can also control the individual data loggers 151-156 to control certain ones of them to log more data than others, based on whether the problem is identified as a sensor problem, a system problem, a subsystem problem, or a component problem. Log control system 204 can also control log scanning system 168 to increase the frequency with which the data logs 160-164 are scanned for fault tags and fault signatures or data patterns.

Data package generator 206 illustratively generates a data package containing the relevant log data from data logs 132 and output generator 208 controls communication system 126 to output the fault data package as fault information 118 to fault analysis system 102.

Figure 3:
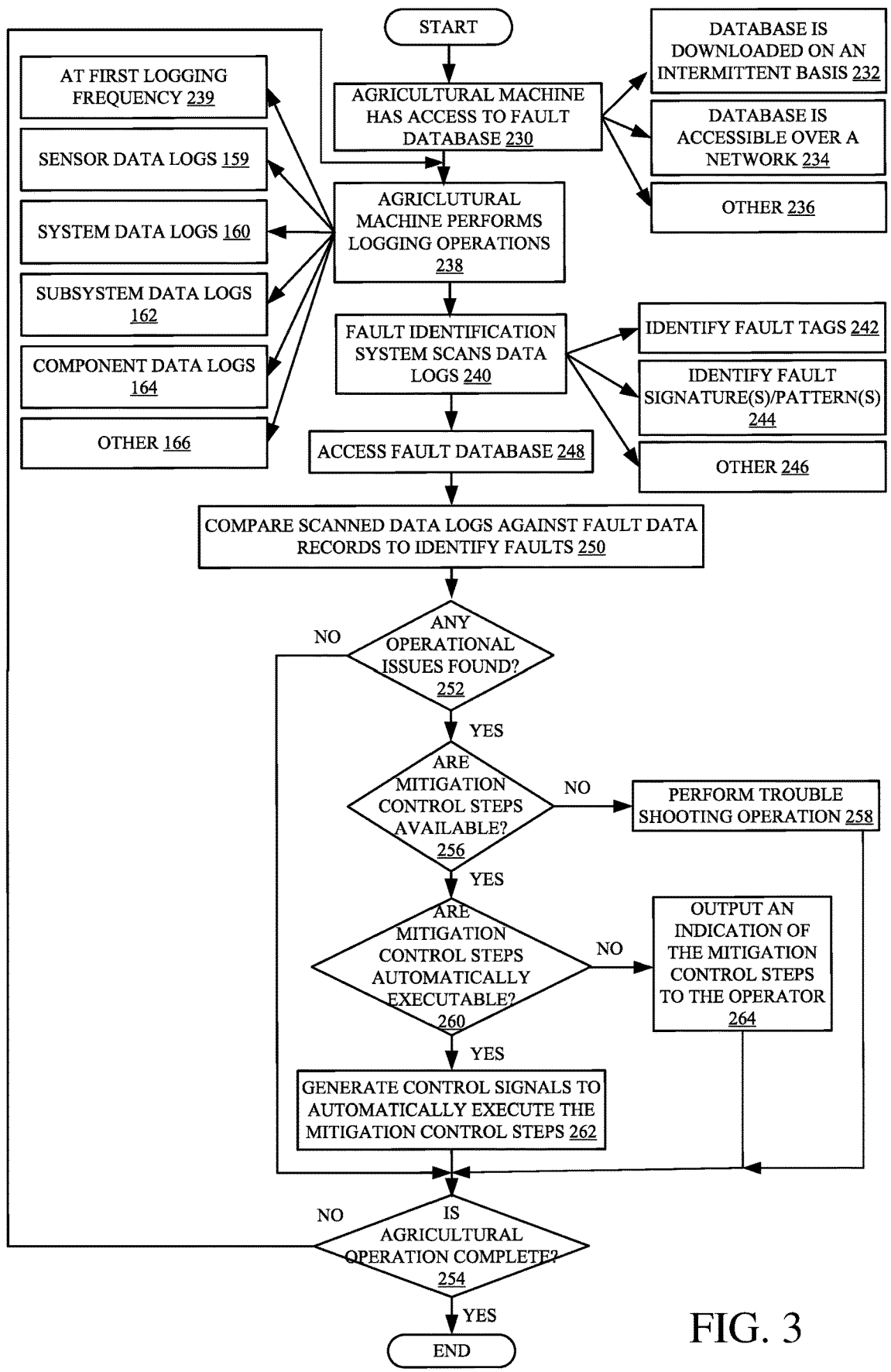
FIG. 3 is a flow diagram illustrating one example of the operation of an agricultural harvester in identifying and correcting faults using a fault database.

FIG. 3 is a flow diagram illustrating one example of the operation of agricultural machine 104 in identifying faults during runtime operation. It is first assumed that agricultural machine 104 has access to fault database 136, as indicated by block 230 in the flow diagram of FIG. 3. In the example discussed herein, it will be assumed that download system 183 downloads fault database 136 from fault analysis system 102, intermittently, over network 108, as indicated by block 232. In another example, agricultural machine 104 may have access to fault database 136 over network 108, or another network, as indicated by block 234, without downloading fault database 136. Agricultural machine 104 may have access to the fault database 136 in other ways as well, as indicated by block 236.

During operation, log generation system 130 performs logging operations logging data from the various sensors 128, systems 142, subsystems 144 and components 146. Performing logging operations is indicated by block 238. The logging operations during normal agricultural machine operation may be performed at a first frequency as indicated by block 240. Sensor data logger 151 generates the sensor data logs 159. System data logger 152 generates system data logs 160. Subsystem data logger 154 generates subsystem data logs 162, and component data logger 156 generates component data logs 164. Other logs 166 can be generated as well. The values in the logs 159-166 are operational characteristic values indicative of the operational characteristics of agricultural machine 104.

Also, during the operation of agricultural machine 104, log scanning system 168 scans the data logs 132 to obtain data from the logs 132 for further processing by fault identification system 134 to identify operational issues, such as faults or problems in the operation of agricultural machine 104. Scanning the data logs is indicated by block 240 in the flow diagram of FIG. 3. Block 242 shows that fault tag identifier 170 may identify and access fault tags that are generated by log generation system 130. Block 244 indicates that fault signature/pattern identifier 172 identifies and accesses fault signatures or data patterns in the data logs 132. Other scanning systems can scan data logs 132 for other items as well, as indicated by block 246.

Fault database accessing system 176 then accesses the fault data records 184-186 in fault database 136, and fault identifier 177 compares the data scanned from data logs 132 against the data in fault data records 184-186 to identify whether any faults have occurred or are occurring on agricultural machine 104. Accessing the fault database 136 is indicated by block 248 in the flow diagram of FIG. 3 and comparing the scanned data logs 132 against the fault data records to identify faults is identified by block 250.

For example, it may be that some sensor data from a sensor 128 or other data already has a fault tag applied, such as where a sensor reading is below a threshold, where a performance metric is outside of a specified range, etc. In that case, the fault tag in the data log 132 may be compared against the tags 194 in the fault data records 184 to identify the particular fault that the tag represents. In another example, fault signature/pattern identifier 172 can obtain signatures or data patterns from the data logs 132 and provide those signatures or patterns to fault identifier 177 so fault identifier 177 can compare those signatures or data patterns against the signature/pattern data 192 in the fault data records 184-186 to determine whether a fault data record 184-186 matches the signature or data pattern obtained from the data logs 132.

If no matching fault data records 184-186 are found, then this means that no fault has been identified by fault identification system 134. If no (faults) are found, as indicated by block 252, then processing reverts to block 238 where agricultural system 104 continues to generate data logs 132 and scan them for errors.

However, if, at block 252, a matching fault data record (e.g., fault data record 184) is found, then this means that a fault is occurring or has occurred on agricultural machine 104. If a fault is found, mitigation control step identifier 178 accesses the matching fault data record 184 to obtain the mitigation control steps 196 that will mitigate or remedy the fault corresponding to the matched fault data record 184. Determining whether any mitigation control steps are available is indicated by block 256. If not, then mitigation control step identifier 178 provides an output to output generator 180 indicating that no mitigation control steps 196 are available for this fault. Output generator 180 can generate an output to control signal generator 140 which controls troubleshooting system 138 to initiate a troubleshooting operation, as indicated by block 258, and as is described in greater detail below with respect to FIG. 4.

However, if, at block 256, it is determined that mitigation control steps 196 are available for the identified fault, then mitigation control step identifier 178 determines whether the mitigation control steps can be taken automatically or whether the mitigation control steps need manual intervention, as indicated by block 260. If the mitigation control steps 196 can be automatically executed, then output generator 180 generates an output indicating this to control signal generator 140 which generates control signals to execute the mitigation control steps. Generating control signals to automatically execute the mitigation control steps is indicated by block 262 in the flow diagram of FIG. 3. If the mitigation control steps 196 are not automatically executable, then output generator 180 generates an output to control signal generator 140 so control signal generator 140 controls operator interface mechanisms 148 to output an indication (e.g., a recommendation, a list, etc.) of the mitigation control steps to operator 114, as indicated by block 264. Operator 113 can then manually execute some or all of the mitigation control steps. Feedback can also be provided to fault analysis system 102 indicating the detected fault and whether the mitigation control steps mitigated the fault (as indicated automatically or based on an operator input). The feedback can be used for machine learning or other learning systems to improve the accuracy and coverage of fault database 136.

Figure 4A:
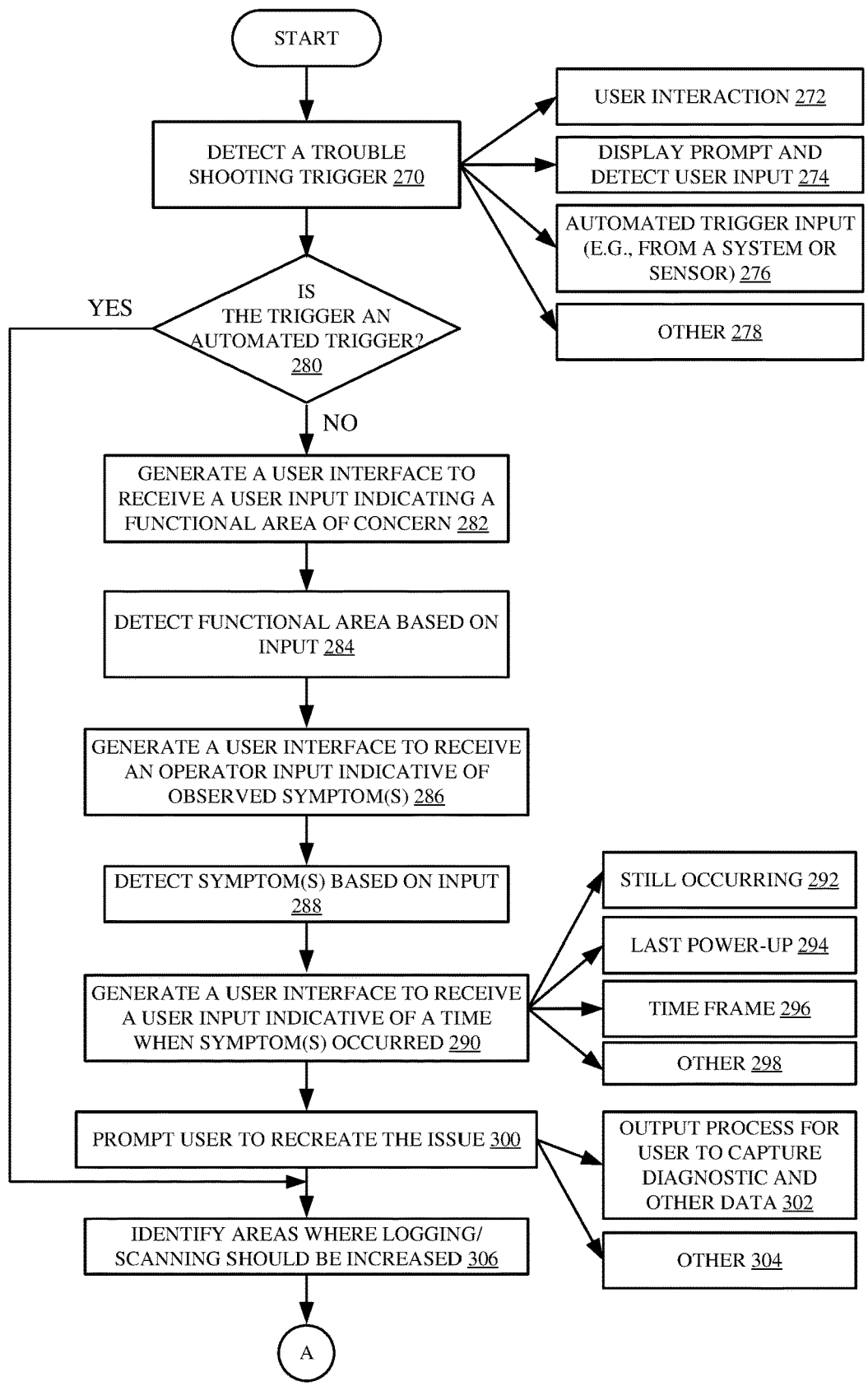
FIGS. 4A and 4B (collectively referred to herein as FIG. 4) show one example of a flow diagram illustrating how the fault database is generated and downloaded and used in the context of a troubleshooting environment.
Figure 4B:
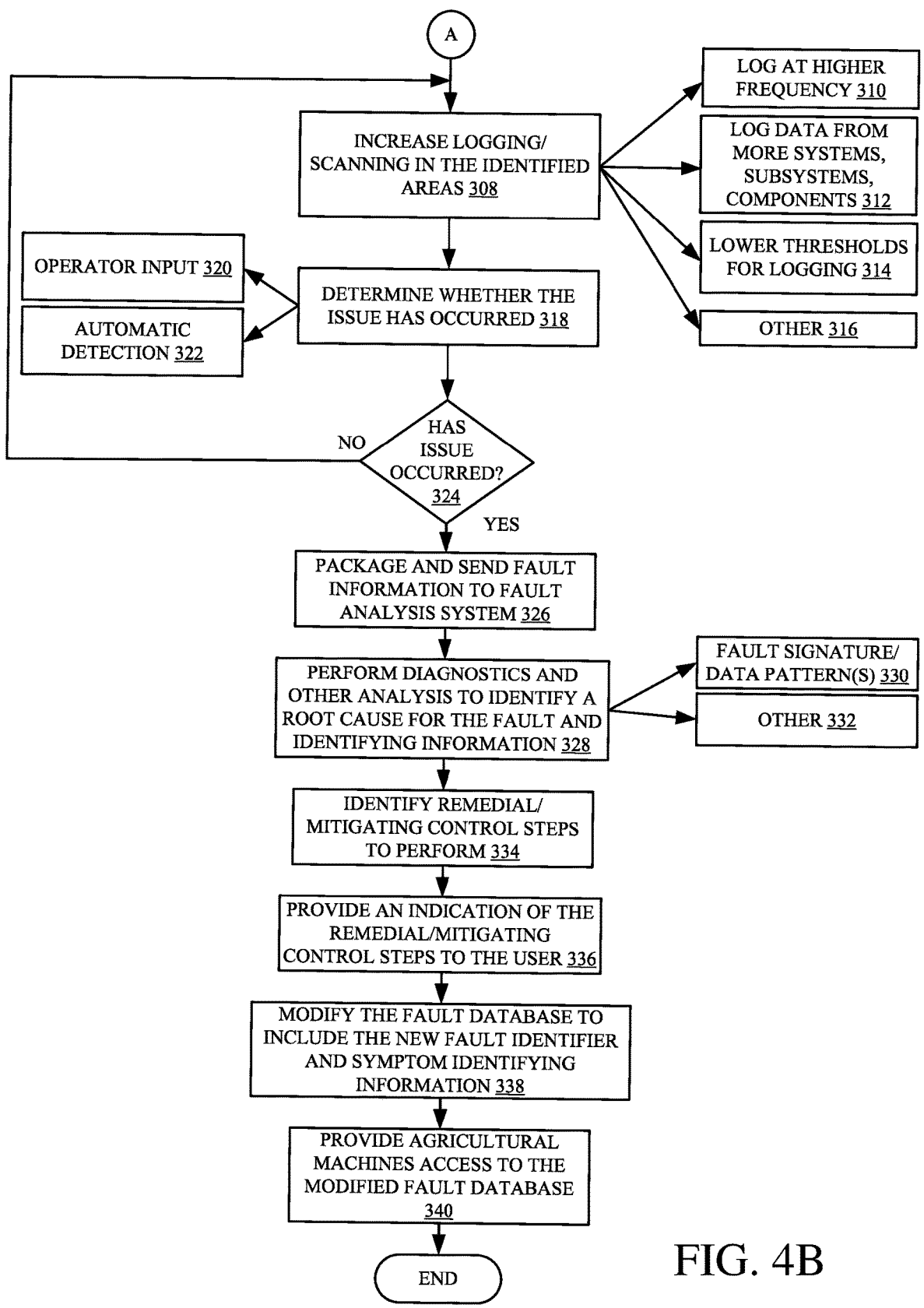

FIGS. 4A and 4B show a flow diagram illustrating performance of a troubleshooting operation when fault identification system 184 is unable to identify a fault with mitigation control steps 196 in fault database 136 for a set of scanned log data from data logs 132. At block 270, trigger detector 200 first detects a troubleshooting trigger indicating that troubleshooting system 138 should initiate a troubleshooting operation. In one example, trigger detector 200 detects an input from operator 114 initiating the troubleshooting operation, as indicated by block 272. For instance, the operator 114 may observe a fault and trigger the troubleshooting operation. In another example, fault identification system 134 generates a prompt on operator interface mechanism 148 requesting that operator 114 initiate a troubleshooting operation, as indicated by block 274. In another example, any of the systems 142, subsystems 144, or sensors on agricultural machine 104 may generate an output automatically triggering a troubleshooting operation in troubleshooting system 138, as indicated by block 276. The trigger to perform a troubleshooting operation can be detected in other ways as well, as indicated by block 278.

If the trigger detector 200 detects a trigger based on an operator input from operator 114, as indicated by block 280, then user interface controller 202 controls an operator interface mechanism 148 to generate prompts to obtain additional information from operator 114. For instance, functionality area identifier 212 can conduct a user interaction, prompting operator 114 for information to identify the functional area of the agricultural machine 104 where the problem is occurring. Some examples of functional areas may include, for a tillage machine, automated line following, section control, etc. Generating an interface to receive a user input indicating the functional area of concern is indicated by block 282. Functional area identifier 212 then detects the operator input to identify which functional area is of concern to operator 114. Detecting the functional area is indicated by block 284.

Symptom identifier 214 may also control operator interface mechanisms 148 to generate prompts to obtain an operator input indicative of observed symptoms, as indicated by block 286. Symptom identifier 214 then detects the operator input to identify the symptoms. Detecting the symptoms can be done by receiving a textual input from operator 114, by receiving a selection input (such as from a drop down menu or other selectable operator input mechanism) or in other ways.

Symptom identifier 214 may also generate prompts allowing the operator 114 to identify when the symptoms occurred, as indicated by block 290. For instance, operator 114 may provide an input indicating that the symptoms are still occurring as indicated by block 292. Operator 114 may provide an input indicating that the symptoms occurred during the last power up of agricultural machine 104 as indicated by block 294. Operator 114 may provide an input indicating a specified time frame or a specified period during the agricultural operation when the symptom occurred as indicated by block 296. Operator 114 may provide an input identifying the timing of when the symptom occurred in other ways as well, as indicated by block 298.

It may also be that troubleshooting system 138 determines that, in order to best analyze the problem, operator 114 should attempt to recreate the problem so that accurate data can be captured by log generation system 130 or in other ways. Issue recreation identifier 216 can thus control operator interface mechanisms 148 to prompt operator 114 to recreate the issue or problem, as indicated by block 300. In one example, issue recreation identifier 216 outputs a process for operator 114 to follow in order to capture diagnostic and other data in order to better analyze the problem or issue. Outputting the process for the operator 114 to capture diagnostic and other data is indicated by block 302. Issue recreation identifier 216 can generate other outputs to control operator interface mechanism 148 to prompt operator 114 to recreate the issue in other ways as well, as indicated by block 304.

When the troubleshooting system is automatically triggered, or when operator 114 is attempting to recreate the fault, then log control system 204 identifies areas where logging or scanning should be increased, as indicated by block 306. For instance, where the suspected problem is a problem with one of the components 146 of agricultural machine 104, then log control system 204 may control log generation system 130 and log scanning system 168 to increase the frequency with which data is logged from a component or a set of components 146 and to increase the frequency with which that data is scanned for fault tags or a fault signature. Log control system 204 can identify the areas where logging and/or scanning should be increased in other ways as well.

Once the areas where logging and/or scanning are to be increased are identified, then log control system 204 controls log generation system 130 and log scanning system 168 to increase the logging and/or scanning in the identified areas, as indicated by block 308. For instance, as discussed above, log control system 204 can control log generation system 130 to increase the frequency with which data is captured and logged, as indicated by block 310. Log control system 204 may control log generation system 130 to preferentially increase the logging of data from certain systems 142, subsystems 144, and/or components 146, as indicated by block 312. Log control system 204 can also control log generation system 130 to modify when log data is captured and stored. For instance, it may be that log generation system 130 is configured to log data from a specific sensor data when that specific sensor generates a sensor value that is above a particular threshold. In order to increase the amount of log data that is captured from the sensor, log control system 204 may lower the threshold for capturing and logging data, as indicated by block 314. This will increase the amount of data logged from the specific sensor. Increasing the logging or scanning of data can be done in a wide variety of other areas as well, as indicated by block 316.

Issue recreation identifier 216 can then determine whether the fault has been successfully recreated, as indicated by block 318. For instance, it may be that issue recreation identifier 216 generates an output on an operator interface mechanism 148 that allows operator 114 to manually indicate that the fault has been recreated, as indicated by block 320. Similarly, it may be that fault identification system 134 can automatically identify that the fault has been detected, as indicated by block 322. If the fault has not been recreated, as indicated by block 324, then processing reverts to block 308 where the logging and scanning continues in an increased way. However, once the fault has occurred or been recreated, then data package generator 206 generates a data package that includes the various data logs 132, any outputs from fault identification system 134 or other information that may be helpful in analyzing the data, and sends that package as fault information 118 to fault analysis system 102. Packaging and sending the fault information to fault analysis system 118 is indicated by block 326 in the flow diagram of FIG. 4.

Fault analysis system 102 then performs diagnostics and other analysis on the information in the particular data in the fault information 118 that identifies the fault to identify a root cause for the fault. Performing diagnostics on the fault information 118 to identify the fault that is occurring is indicated by block 328. The data in fault information 118 that identifies the fault may be a fault signature or other data pattern that is identified as being correlated to the fault, and thus being indicative that the fault is occurring. Identifying a fault signature or data patterns is indicated by block 330. The diagnostics and analysis can be performed in other ways to identify the root cause and the corresponding system information identifying that fault (e.g., the fault signature), as indicated by block 332.

Fault analysis system 102 also identifies remedial or mitigating control steps that can be performed in order to address the fault, as indicated by block 334. The remedial or mitigating control steps can be provided back to agricultural machine 104 through communication system 126 and displayed or otherwise output through operator interface mechanisms 148 to operator 114, as indicated by block 336. Fault analysis system 102 can also modify the fault database 136 to include the new fault identifier and symptom identifying information (the fault signature or data patterns) along with the mitigation control steps, as indicated by block 338. The modified fault database can then be provided for access by agricultural machine 104, as indicated by block 340. The modified fault database can be downloaded to agricultural machine 104 (as well as other agricultural machines) or fault analysis system 102 can access the modified fault database in other ways as well.

A number of specific examples will now be discussed.

Assume that the fault is that the agricultural machine 104 (which may be a planter) exhibits poor performance in following a pre-defined path. The poor performance can be simply deviating from the path, or can exhibit an abnormal delay in acquiring and following the path. An agricultural machine 104 may, for example, have a five to ten second delay when acquiring the pre-defined path. Although the automated track following system does function, it may not report an issue to the operator. The log generation system 130 a does record this delay within the system data log 160. However, assume also that the problem only occurs after 2-3 days of continuous operation. In such a scenario, this type of intermittent issue is not observable on-board or offboard by the operator 114. Similarly, a remote supervisor would not likely realize that the issue has occurred until the seeds emerge and the job quality can be observed by observing the crop rows.

One way to detect a delayed line acquisition is to analyze the logged system data in system data logs 160 for the automated track following system and looking for an indication of reduced performance (such as a five to ten second delay in acquiring the path). Another method of detecting poor line following is to monitor system data log 162 that identifies target versus actual machine heading of agricultural machine 104, or the heading error from the automated track following system and determine when the accumulated heading error is greater than a given threshold.

When any of these items are detected, log control system 204 can increase the logging levels (the frequency with which data is logged, the type of data logged, etc.). This exposes the underlying issue in the system data logs 160. The log control system 204 can then place a marker in the data log 132 so that the relevant data can easily be retrieved and sent as part of the fault information 118 in the data package generated by data package generator 206. One mitigation control step may be to generate a software patch to the automated track following system that is downloaded and installed on agricultural machine 104. The fault analysis system 102 can then modify the fault database 120 to include the signature (the delay in path acquisition, heading error, etc.) so the error can be quickly identified and mitigated by other agricultural machines.

Another example of a fault that is difficult to diagnose is when the processor 124 is running a control algorithm and the control algorithm crashes during operation due to memory allocation errors in the memory corresponding to processor 124. Again, system data logs 160 or subsystem data logs 162 that capture processor performance and memory allocation can be obtained by data package generator 206 to send that data as part of the data package or fault information 118 that is sent to fault analysis system 102. Fault analysis system 102 can then identify the fault and generate the mitigating control steps (which can be sent to agricultural machine 104) and modify the fault database 120 so the fault can be quickly identified and mitigated by other agricultural machines.

It can thus be seen that the present description describes a system in which faults from a plurality of different machines can be aggregated, and analyzed and mitigation control steps for those faults can be generated in a fault database. The fault database can be intermittently updated on the agricultural machines so that the machines can more readily identify and mitigate errors that have not occurred before on those machines.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, they can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 5:
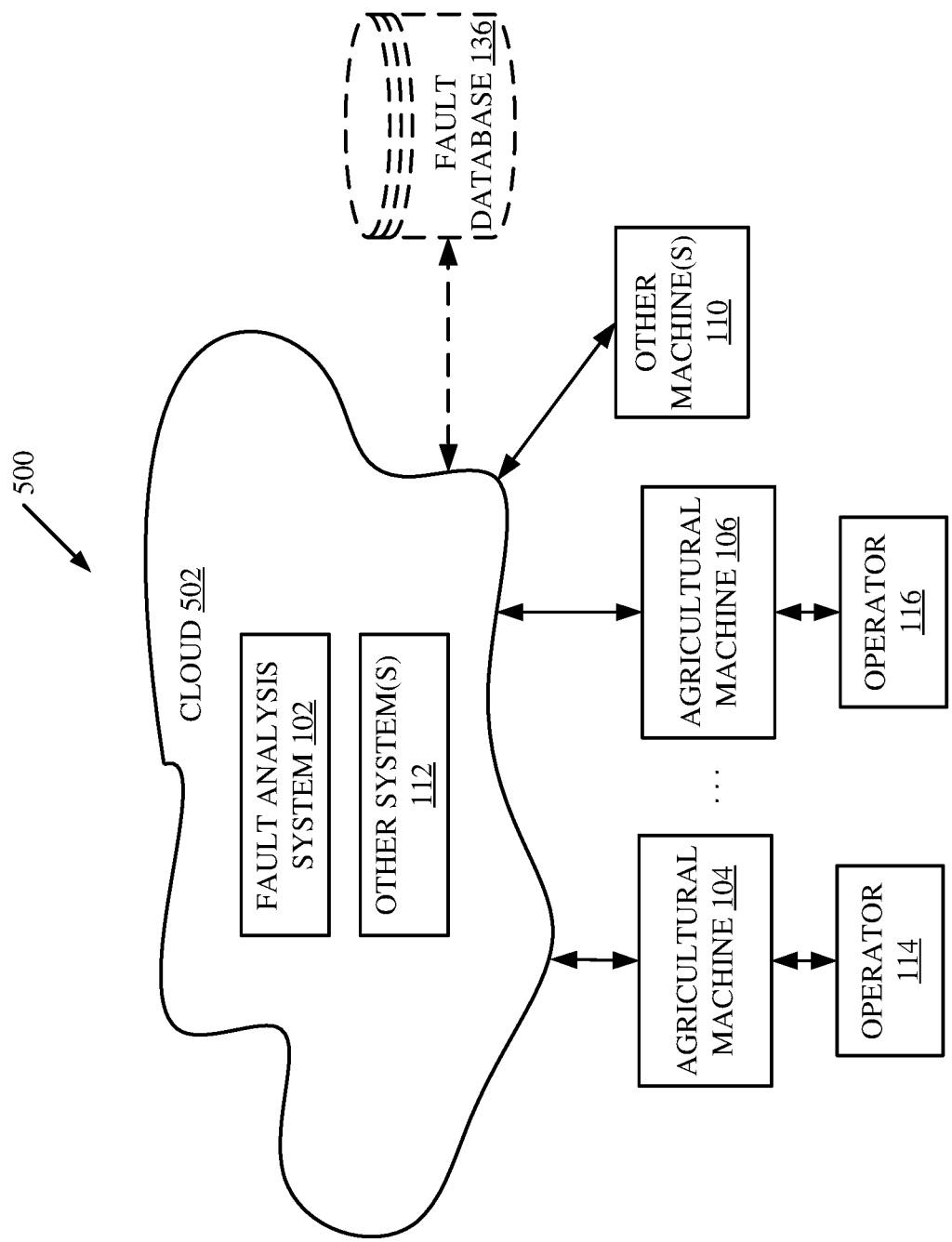
FIG. 5 is a block diagram showing one example of an agricultural system deployed in a remote server architecture.

FIG. 5 is a block diagram of agricultural system 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIGS. 1-2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 5, some items are similar to those shown in FIGS. 1-2 and they are similarly numbered. FIG. 5 specifically shows that fault analysis system 102 and other systems 112 can be located at a remote server location 502. Therefore, agricultural machines 104-106 access those systems through remote server location 502.

FIG. 5 also depicts another example of a remote server architecture. FIG. 5 shows that it is also contemplated that some elements of FIGS. 1-2 are disposed at remote server location 502 while others are not. By way of example, fault database 136 can be disposed at a location separate from location 502, and accessed through the remote server at location 502. Regardless of where they are located, they can be accessed directly by agricultural machines 104-106, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the agricultural machine 104 comes close to the fuel truck for fueling, the system automatically collects the information from the agricultural machine 104 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the agricultural machine 104 until the harvester enters a covered location. The agricultural machine 104, itself, can then send the information to the main network.

It will also be noted that the elements of FIGS. 1-2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
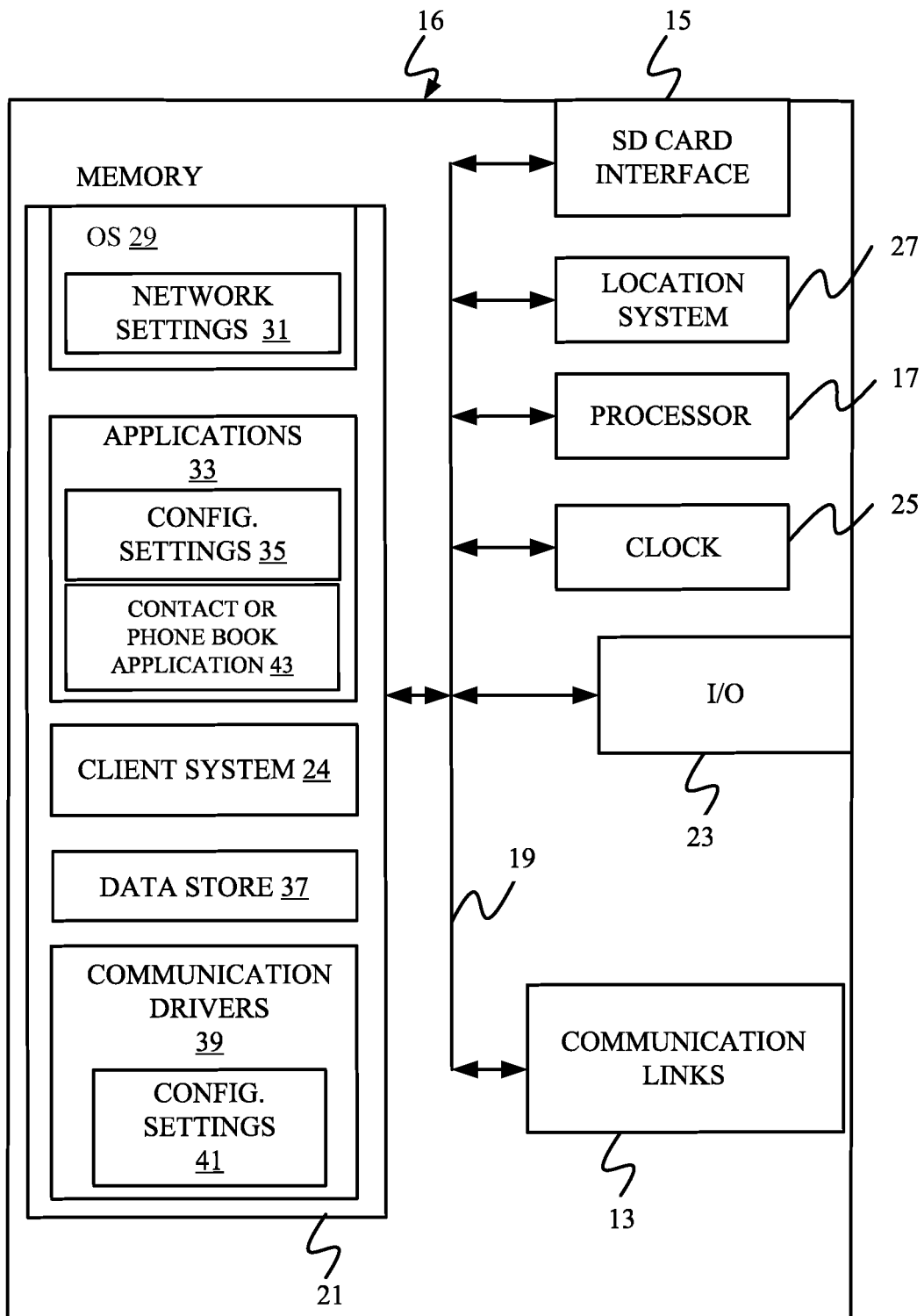
FIGS. 6, 7, and 8 show examples of mobile devices that can be used in various architectures.
Figure 7:
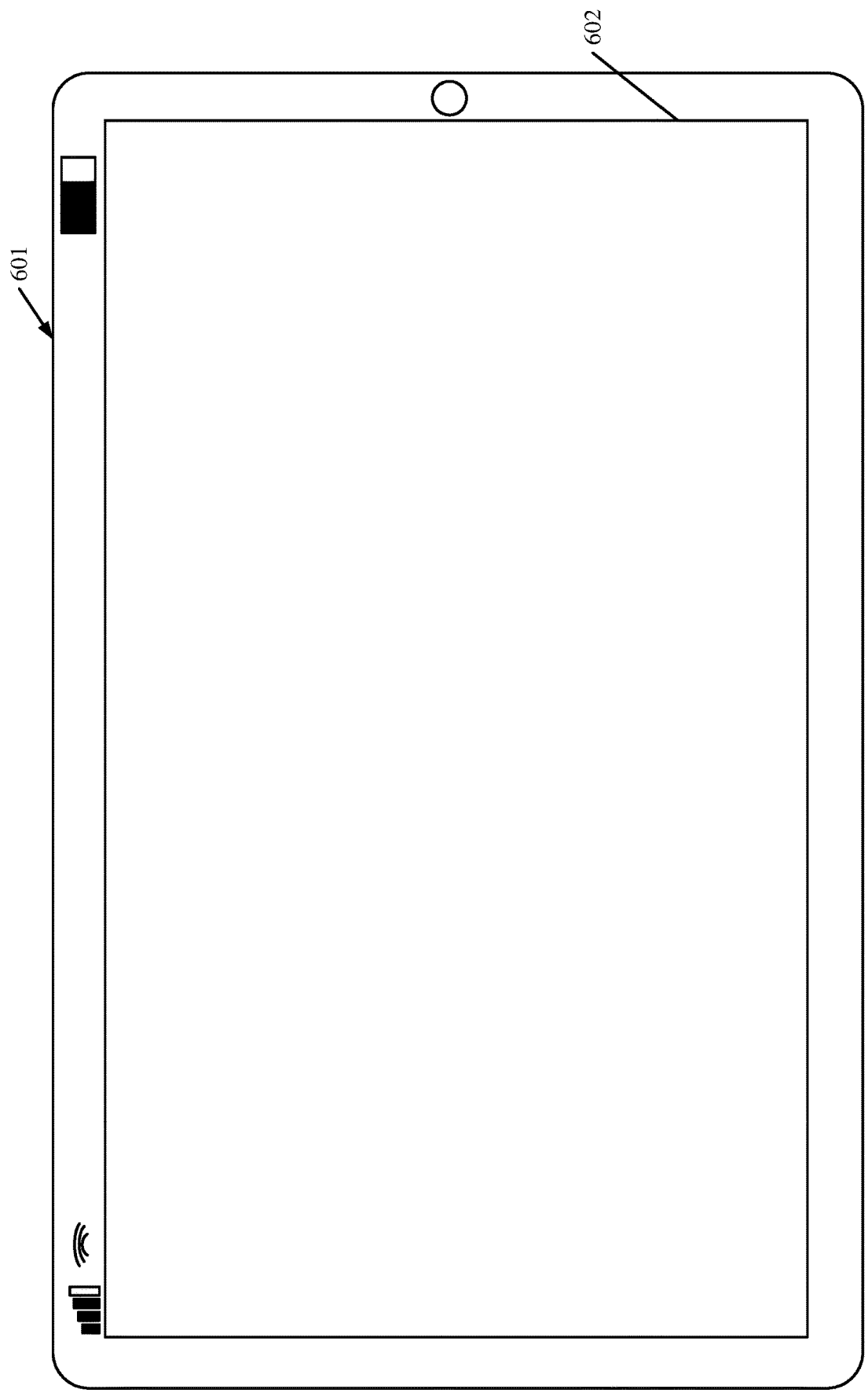
Figure 8:
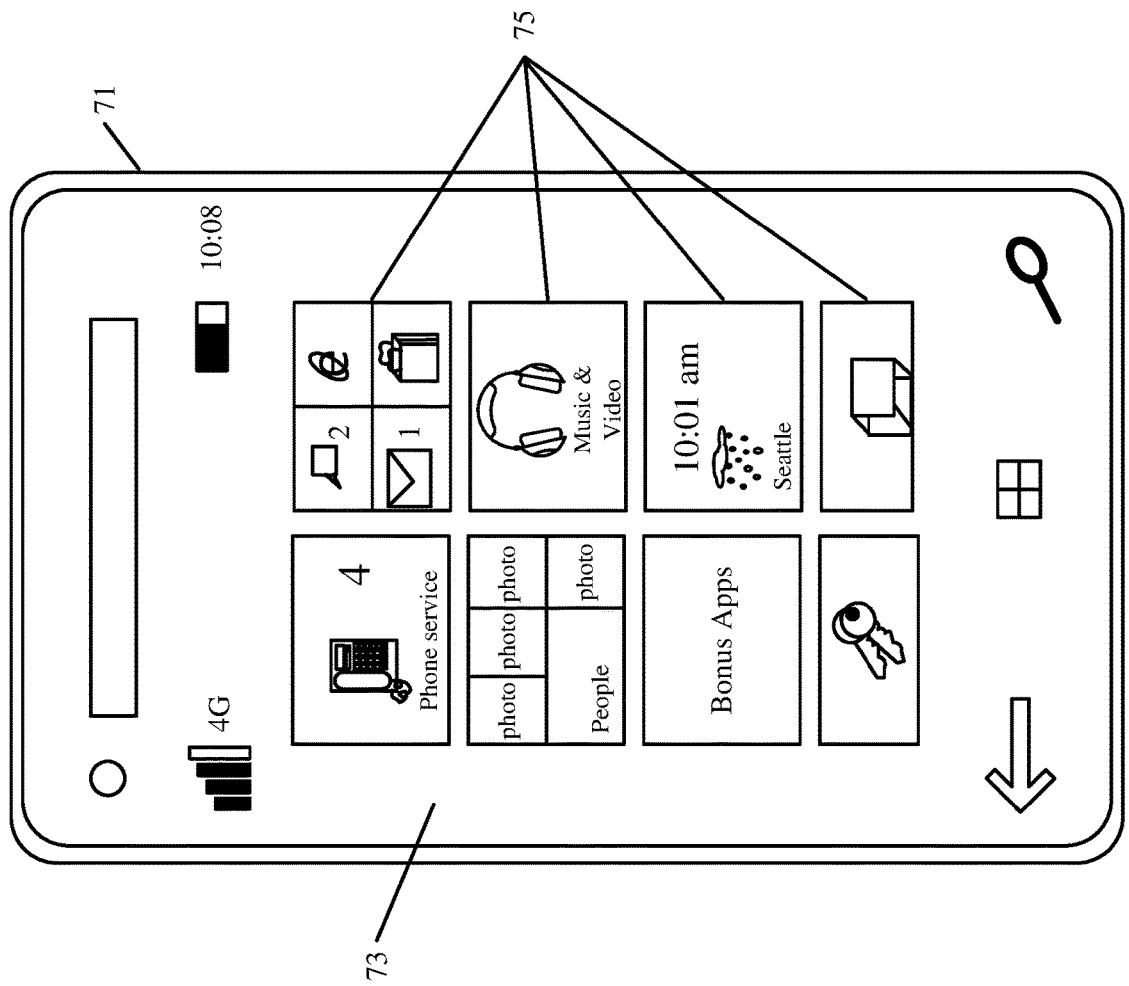
Figure 9:
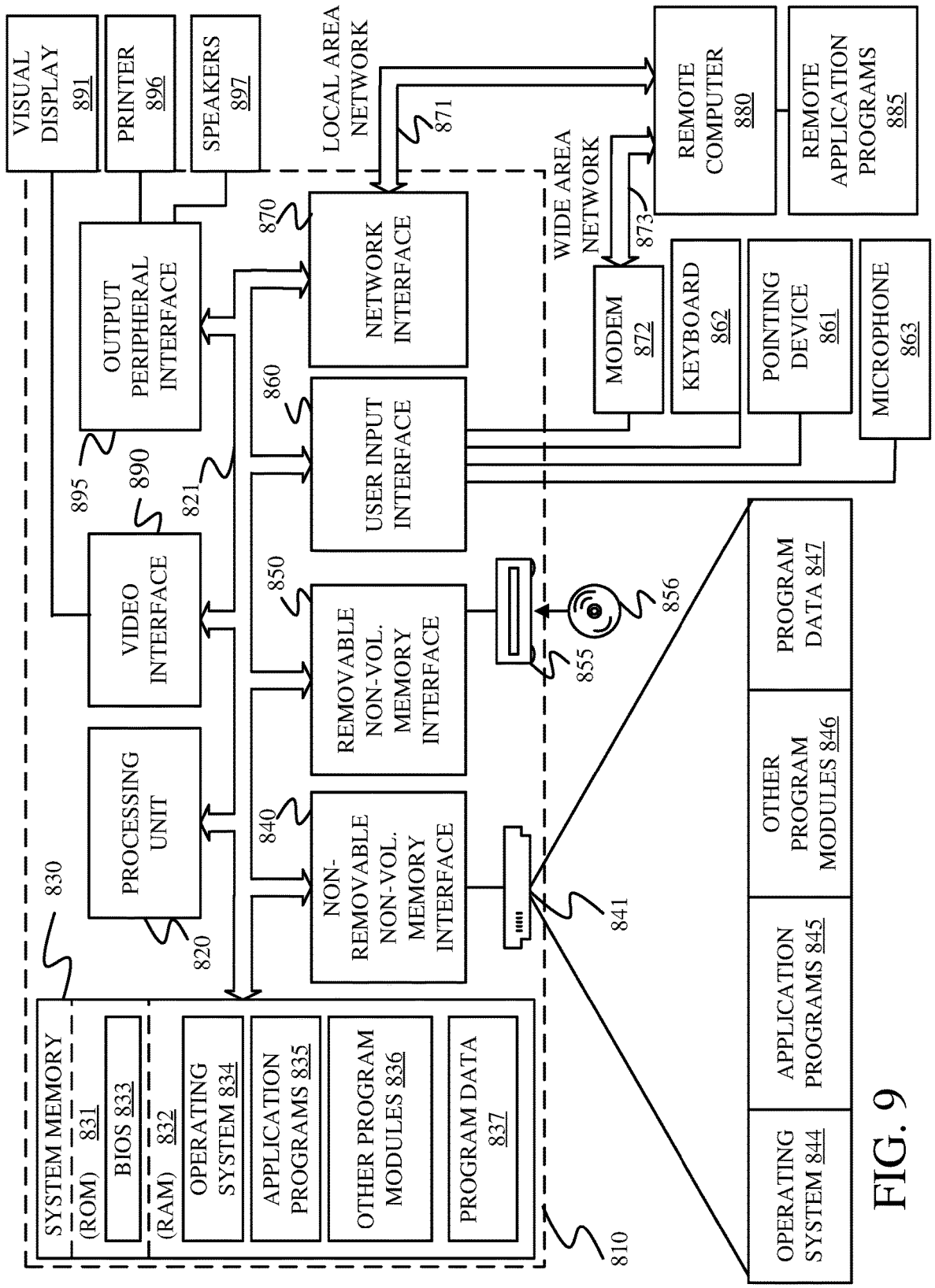
FIG. 9 is a block diagram of one example of a computing environment that can be used in various architectures.

FIG. 6 is a simplified block diagram of one illustrative embodiment of a handheld or mobile computing device that can be used as a user's or client's hand held device 16, in which the present system (or parts of it) can be deployed. For instance, a mobile device can be deployed in the operator compartment of agricultural machine 104 for use in generating, processing, or displaying the fault data, mitigation control steps, etc. FIGS. 7-9 are examples of handheld or mobile devices.

FIG. 6 provides a general block diagram of the components of a client device 16 that can run some components shown in FIGS. 1-2, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one example in which device 16 is a tablet computer 600. In FIG. 7, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 9 is one embodiment of a computing environment in which elements of previous FIGS. or parts of it, (for example) can be deployed. With reference to FIG. 9, an example system for implementing some embodiments includes a computing device in the form of a computer 810 programmed to operate as discussed herein. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural system, comprising:
a log generation system that generates a set of data logs logging operation characteristic values indicative of operation characteristics of an agricultural machine;
a fault identification system that compares the operation characteristic values to a set of fault data records in a fault database to identify a matching fault data record, each fault data record including fault identifying information that identifies an occurrence of a fault in operation of the agricultural machine; and
a control signal generator that generates a control signal to control the agricultural machine based on a fault identified by the matching fault data record.

Example 2 is the agricultural system of any or all previous examples wherein the fault identification system comprises:
a fault signature identifier configured to identify a data pattern in the data logs; and
a fault identifier configured to compare the identified data pattern to the fault identifying information.

Example 3 is the agricultural system of any or all previous examples wherein the matching fault data record includes a mitigation control step identifier identifying a mitigation control step corresponding to the fault.

Example 4 is the agricultural system of any or all previous examples wherein the fault identification system comprises:

a mitigation control step identifier configured to identify the mitigation control step in the matching fault record corresponding to the identified fault, wherein the control signal generator generates the control signal to execute the mitigation control step.

Example 5 is the agricultural system of any or all previous examples wherein the log generation system is configured to generate a fault tag on a data log, of the set of data logs, based on the characteristic value.

Example 6 is the agricultural system of any or all previous examples wherein the fault identification system is configured to compare the fault tag to the set of fault data records to identify the matching fault data record.

Example 7 is the agricultural system of any or all previous examples and further comprising:
a troubleshooting trigger detector configured to detect a troubleshooting trigger; and
a log control system configured to control a logging operation performed by the log generation system in a functional area of the agricultural machine based on the detected troubleshooting trigger.

Example 8 is the agricultural system of any or all previous examples wherein the log control system is configured to control the logging operation performed by the log generation system in a functional area of the agricultural machine to increase a logging frequency at which the data logs are generated.

Example 9 is the agricultural system of any or all previous examples wherein the log control system is configured to control a logging operation performed by the log generation system in a functional area of the agricultural machine to increase a number of systems of the agricultural machine from which data is logged.

Example 10 is the agricultural system of any or all previous examples and further comprising:
a sensor configured to generate a sensor signal indicative of a sensed variable and wherein the log generation system logs the operation characteristic values based on a sensor signal threshold level and wherein the log control system is configured to control the logging operation by reducing the sensor signal threshold.

Example 11 is the agricultural system of any or all previous examples and further comprising:
a user interface controller configured to generate an interactive user interface to receive a user input indicative of the functional area of the agricultural machine.

Example 12 is the agricultural system of any or all previous examples wherein the user interface controller is configured to generate a recreation output indicating that the agricultural machine is to be controlled to recreate the fault and indicating a process for capturing diagnostic data corresponding to the fault.

Example 13 is the agricultural system of any or all previous examples wherein the user interface controller is configured to generate an interactive time interface to receive a user input indicating a time when symptoms of the fault occurred.

Example 14 is a method of controlling an agricultural system, the method comprising:
generating a set of data logs logging operation characteristic values indicative of operation characteristics of an agricultural machine;
comparing the operation characteristic values to a set of fault data records in a fault database to identify a matching fault data record, each fault data record including fault identifying information that identifies an occurrence of a fault in operation of the agricultural machine; and
generating a control signal to control the agricultural machine based on a fault identified by the matching fault data record.

Example 14 is the method of any or all previous examples wherein comparing the operation characteristic values to a set of fault data records in a fault database to identify a matching fault data record comprises:
identifying a data pattern in the data logs as a fault signature; and
comparing the fault signature to the fault identifying information.

Example 15 is the method of any or all previous examples wherein the matching fault data record includes a mitigation control step identifier, and further comprising:
identifying a mitigation control step corresponding to the fault based on the mitigation control step identifier.

Example 17 is the method of any or all previous examples wherein comparing the operation characteristic values to a set of fault data records in a fault database to identify a matching fault data record comprises:
identifying the mitigation control step in the matching fault record corresponding to the identified fault, wherein generating a control signal includes generating the control signal to execute the mitigation control step.

Example 18 is an agricultural system, comprising:
a communication system configured to receive a first set of fault information from a first agricultural machine and a second set of fault information from a second agricultural machine;
a fault information processing system that generates a first fault data record identifying a first fault corresponding to the first set of fault information and that generates a second fault data record identifying a second fault corresponding to the second set of fault information; and
a fault database generation system that generates a fault database that includes the first fault data record and the second fault data record, the communication system sending the fault database to the first agricultural machine and the second agricultural machine.

Example 19 is the agricultural system of any or all previous examples wherein the communication system is configured to receive a subsequent set of fault information from the first agricultural machine, and wherein the fault information processing system is configured to generate a subsequent fault data record identifying a subsequent fault corresponding to the subsequent set of fault information.

Example 20 is the agricultural system of any or all previous examples wherein the fault database generation system is configured to generate a modified fault database that includes the subsequent fault data record and wherein the communication system is configured to send the modified fault database to the first agricultural machine and the second agricultural machine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An agricultural system, comprising:
one or more processors;

memory;
computer executable instructions, stored in the memory and executable by the one or more processors, the computer executable instructions, when executed by the one or more processors, configuring the one or more processors to:
- generate a set of data logs logging operation characteristic values indicative of operation characteristics of an agricultural machine;
- compare the operation characteristic values to a set of fault data records in a fault database to identify a matching fault data record, each fault data record including fault identifying information that identifies an occurrence of a fault in operation of the agricultural machine, wherein at least one fault data record, of the set of fault data records, includes a respective mitigation control step identifier identifying a respective mitigation control step corresponding to the fault in operation of the agricultural machine identified by the fault identifying information of the fault data record; and
- generate a control signal to control the agricultural machine based on a fault in operation of the agricultural machine identified by the fault identifying information of the matching fault data record.

2. The agricultural system of claim 1 wherein the computer executable instructions, when executed by the one or more processors, further configure the one or more processors to:
- identify a data pattern in the data logs; and
- compare the identified data pattern to the fault identifying information.

3. The agricultural system of claim 2 wherein the matching fault data record includes a respective mitigation control step identifier identifying a respective mitigation control step corresponding to the fault in operation of the agricultural machine identified by the fault identifying information of the matching fault data record and wherein the computer executable instructions, when executed by the one or more processors, further configure the one or more processors:
- identify the respective mitigation control step corresponding to the fault in operation of the agricultural machine identified by the fault identifying information of the matching fault data record based on the respective mitigation control step identifier of the matching fault data record; and
- generate the control signal to cause execution of the identified respective mitigation control step corresponding to the fault in operation of the agricultural machine identified by the fault identifying information of the matching fault data record.

4. The agricultural system of claim 1 wherein the computer executable instructions, when executed by the one or more processors, further configure the one or more processors to:
- determine that the matching fault data record does not include a respective mitigation control step identifier.

5. The agricultural system of claim 1 wherein the computer executable instructions, when executed by the one or more processors, further configure the one or more processors to generate a fault tag on a data log, of the set of data logs, based on the characteristic values.

6. The agricultural system of claim 5 wherein the computer executable instructions, when executed by the one or more processors, further configure the one or more processors to compare the fault tag to the set of fault data records to identify the matching fault data record.

7. The agricultural system of claim 4 wherein the computer executable instructions, when executed by the one or more processors, further configure the one or more processors to:
- detect a troubleshooting trigger based on the determination that the matching fault data record does not include a respective mitigation control step identifier; and
- control a logging operation performed in a functional area of the agricultural machine based on the detected troubleshooting trigger.

8. The agricultural system of claim 7 wherein the computer executable instructions, when executed by the one or more processors, further configure the one or more processors to control the logging operation performed in the functional area of the agricultural machine to increase a logging frequency at which the data logs are generated.

9. The agricultural system of claim 7 wherein the computer executable instructions, when executed by the one or more processors, further configure the one or more processors to control the logging operation performed in the functional area of the agricultural machine to increase a number of systems of the agricultural machine from which data is logged.

10. The agricultural system of claim 7 and further comprising:
- a sensor configured to generate a sensor signal indicative of a sensed variable and wherein the computer executable instructions, when executed by the one or more processors, further configure the one or more processors to log the operation characteristic values based on a sensor signal threshold level and to control the logging operation performed in the functional area of the agricultural machine by reducing the sensor signal threshold.

11. The agricultural system of claim 7 wherein the computer executable instructions, when executed by the one or more processors, further configure the one or more processors to:
- generate an interactive user interface configured to receive a user input indicative of the functional area of the agricultural machine.

12. The agricultural system of claim 11 wherein the computer executable instructions, when executed by the one or more processors, further configure the one or more processors to generate a recreation output indicating that the agricultural machine is to be controlled to recreate the fault and indicating a process for capturing diagnostic data corresponding to the fault.

13. The agricultural system of claim 11 wherein the computer executable instructions, when executed by the one or more processors, further configure the one or more processors to generate an interactive time interface configured to receive a user input indicating a time when symptoms of the fault occurred.

14. A computer implemented method of controlling an agricultural machine, the computer implemented method comprising:
- generating a set of data logs logging operation characteristic values indicative of operation characteristics of the agricultural machine;
- comparing the operation characteristic values to a set of fault data records in a fault database to identify a matching fault data record, each fault data record including fault identifying information that identifies an occurrence of a fault in operation of the agricultural machine, the matching fault data record including a mitigation control step identifier;

identifying a fault based on the fault identifying information of the matching fault data record;

identifying a mitigation control step corresponding to the identified fault based on the mitigation control step identifier of the matching data record; and generating a control signal to control the agricultural machine to execute the identified mitigation control step corresponding to the identified fault.

15. The computer implemented method of claim 14 wherein comparing the operation characteristic values to the set of fault data records in the fault database to identify the matching fault data record comprises:

identifying a data pattern in the data logs as a fault signature; and comparing the fault signature to the fault identifying information.

16. An agricultural system, comprising:

one or more processors;

memory;

computer executable instructions, stored in the memory and executable by the one or more processors, the computer executable instructions, when executed by the one or more processors, configuring the one or more processors to:

receive a first set of fault information from a first agricultural machine and a second set of fault information from a second agricultural machine;

generate a first fault data record identifying a first fault corresponding to the first set of fault information and generate a second fault data record identifying a second fault corresponding to the second set of fault information;

generate a fault database that includes the first fault data record and the second fault data record; and send the fault database to the first agricultural machine and the second agricultural machine.

17. The agricultural system of claim 16 wherein the computer executable instructions, when executed by the one or more processors, further configure the one or more processors to receive a subsequent set of fault information from the first agricultural machine and generate a subsequent fault data record identifying a subsequent fault corresponding to the subsequent set of fault information.

18. The agricultural system of claim 17 wherein the computer executable instructions, when executed by the one or more processors, further configure the one or more processors to generate a modified fault database that includes the subsequent fault data record and send the modified fault database to the first agricultural machine and the second agricultural machine.

* * * * *